UNITED STATES PATENT OFFICE.

STEPHEN S. SOUTHWORTH, OF NIAGARA FALLS, NEW YORK.

IMPROVEMENT IN DENTAL AMALGAMS.

Specification forming part of Letters Patent No. 157,140, dated November 24, 1874; application filed May 4, 1874.

*To all whom it may concern:*

Be it known that I, STEPHEN S. SOUTHWORTH, of the village of Niagara Falls, county of Niagara and State of New York, have discovered a new and useful Process for Preparing Amalgam for Dentists' Use, of which the following is a specification:

Take thirty grains of silver and melt in a crucible, and add to it one hundred and twenty grains of tin. As the tin melts at a lower temperature than silver, the addition of the former, to procure perfect incorporation, is done by adding it in small portions, and when the whole one hundred and twenty grains are melted the whole is raised to a white heat. It is then poured in an ingot. When cold it is again melted, and twenty grains of mercury added. To prevent the evaporation of the mercury, the mass is immediately cooled, and allowed to remain in the mold for a few hours until all chemical or molecular changes have ceased. It is then filed to powder, and the powder pressed into pellets by means of molds. The molds can be made by drilling holes in a plate of brass or other material. The holes are filled with the powder, and condensed with plungers. The mercury in the mixture produces sufficient adhesiveness to cause the powder to adhere in the form of pellets.

To use the ordinary amalgams in use at the present day, the mercury is incorporated with the powder when required for use, after which it is washed to remove the oxide caused by the excess of mercury, after which the excess is removed by pressure through chamois leather.

The advantages of my amalgam are in being ready for use without preparation by the dentist, the absence of an excess of mercury, and the absence of any chemical changes—a quality which prevents the shrinkage seen in all amalgams prepared in the old way.

I do not claim any new materials in my amalgam; but

What I do claim as my invention, and desire to secure by Letters Patent, is—

A dental amalgam in which the mercury is incorporated with the other materials while in a molten condition, substantially as and for the purposes described and set forth in my specification.

STEPHEN S. SOUTHWORTH.

Witnesses:
GEO. BARKER,
F. R. DELANO.